United States Patent
Satou et al.

(10) Patent No.: US 7,758,826 B2
(45) Date of Patent: *Jul. 20, 2010

(54) STRUCTURE OF REDUCING AGENT CONTAINER

(75) Inventors: Hirokazu Satou, Ageo (JP); Hiroyuki Kurita, Ageo (JP); Hideki Matsunaga, Ageo (JP); Yasushi Osaku, Ageo (JP); Toshio Kondou, Ageo (JP); Kiyoshi Fukuda, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 901 days.

This patent is subject to a terminal disclaimer.

(21) Appl. No.: 11/595,998

(22) Filed: Nov. 13, 2006

(65) Prior Publication Data

US 2007/0059222 A1     Mar. 15, 2007

Related U.S. Application Data

(63) Continuation of application No. PCT/JP2005/003935, filed on Mar. 8, 2005.

(30) Foreign Application Priority Data

May 13, 2004  (JP)  ............................ 2004-143824
Jun. 30, 2004  (JP)  ............................ 2004-194028

(51) Int. Cl.
   *B01D 50/00*  (2006.01)
   *A61L 2/04*  (2006.01)
   *F01N 3/00*  (2006.01)

(52) U.S. Cl. ................. 422/307; 422/168; 422/177; 422/172; 422/106; 422/198; 60/282

(58) Field of Classification Search ............. 422/168, 422/177, 172, 307, 106, 198; 60/282
See application file for complete search history.

(56) References Cited

U.S. PATENT DOCUMENTS

| 6,878,359 | B1 | 4/2005 | Mathes et al. | |
| 7,449,162 | B2* | 11/2008 | Schaller et al. | 423/212 |
| 7,544,328 | B2* | 6/2009 | Osaku et al. | 422/102 |
| 2009/0155133 | A1* | 6/2009 | Osaku et al. | 422/173 |

FOREIGN PATENT DOCUMENTS

| CN | 1719621 A | | 1/2006 |
| CN | 1808727 A | | 7/2006 |
| JP | 5-222923 A | | 8/1993 |
| JP | 2000-027627 A | | 1/2000 |
| JP | 2002-514495 A | | 5/2002 |
| JP | 2004-510151 A | | 4/2004 |
| JP | 2004-257325 A | | 9/2004 |
| WO | WO 99/58230 A1 | | 11/1999 |
| WO | WO 00/75643 A1 | | 12/2000 |
| WO | WO 02/27280 A2 | | 4/2002 |
| WO | WO2004/042208 | * | 5/2004 |

* cited by examiner

*Primary Examiner*—Walter D Griffin
*Assistant Examiner*—Lessanework Seifu
(74) *Attorney, Agent, or Firm*—Baker & Hostetler LLP (57) ABSTRACT

Mounted on an upper surface of a container main body are a base of a water level indicator detecting a remaining amount of liquid reducing agent, a base of a densitometer detecting concentration of liquid reducing agent, a heat exchanger surrounding detectors of the water level indicator and the densitometer, and circulating engine coolant for heat exchange between liquid reducing agent and engine coolant, and a suction tube for sucking liquid reducing agent from a position adjacent to the bottom of container main body and between water level indicator and densitometer. A box-shaped protector surrounds the water level indicator, densitometer and suction tube which are located in a region adjacent to a lower portion of the heat exchanger. Heat from the heat exchanger is trapped in the protector to generate convection in that region, thereby unfreezing frozen liquid reducing agent around the water level indicator, densitometer and suction tube.

7 Claims, 6 Drawing Sheets

STRUCTURE OF REDUCING AGENT CONTAINER

This application is a continuation of PCT/JP2005/003935, filed on Mar. 8, 2005.

BACKGROUND OF THE INVENTION

1. Field of the Invention

The present invention generally relates to a structure of a reducing agent container for storing therein liquid reducing agent to be used in an exhaust gas purification apparatus for the purpose of reducing and purifying nitrogen oxide (NOx) in an exhaust gas from an engine, and more particularly relates to a technique capable of exhibiting an exhaust gas purification function in a short time after an engine is started.

2. Description of the Related Art

As one typical catalyst purification system capable of removing NOx contained in an exhaust gas from an engine, Japanese Unexamined Patent Publication No. 2000-27627 (patent document 1) discloses and proposes an exhaust gas purification apparatus.

According to this exhaust gas purification apparatus, a reduction catalytic converter is disposed in an engine exhaust pipe, and a liquid reducing agent in response to the engine operating condition is injected to be supplied to the exhaust gas at a position upstream of the reduction catalytic converter, in order to produce a catalytic reduction reaction between NOx in the exhaust gas and the liquid reducing agent thereby purifying NOx into harmless components. In the reduction reaction, ammonia which has excellent reactivity with NOx is used. As the liquid reducing agent, urea aqueous solution which is hydrolyzed by heat of exhaust gas and vapor in the exhaust gas to generate ammonia is used.

Patent Document 1: Japanese Unexamined Patent Publication No. 2000-27627

In a cold district like the northernmost Hokkaido island, Japan, the outside air temperature in winter season becomes lower than a freezing point of the liquid reducing agent, and the liquid reducing agent stored in a reducing agent container is frozen in some cases. The liquid reducing agent starts freezing from an outer periphery thereof near the inner wall of the container that is in direct contact with the outside air, and the freeze gradually advances toward the central portion inside the container. At a bottom of the reducing agent container, there are detectors such as a water level indicator and a densitometer which respectively detect remaining amount and concentration of the liquid reducing agent, and a suction port of the liquid reducing agent. Therefore, there is an adverse possibility that, if the liquid reducing agent is frozen even slightly, the remaining amount and concentration of the liquid reducing agent may be undetectable and the liquid reducing agent can not be supplied to the reduction catalytic converter. For this reason, the reducing agent container is provided with a heat exchanger which circulates engine coolant to exchange heat between the engine coolant and the liquid reducing agent. If the engine is stopped for a long time, however, since the coolant temperature is low immediately after the engine is started, it takes a certain amount of time to unfreeze the frozen liquid reducing agent.

SUMMARY OF THE INVENTION

Hence, in view of the above-described conventional problem, it is an object of the present invention to provide a structure of a reducing agent container capable of purifying exhaust gas in a short time after an engine is started, by trapping heat which is discharged from a heat exchanger in peripheries of various detectors such as a water level indicator and a densitometer, and of a suction port of the liquid reducing agent.

In accordance with the present invention, there is provided a reducing agent container having a container main body storing therein a liquid reducing agent and configured to have such a structure that the container main body having an upper surface on which there are mounted:

a base of a water level indicator which detects a remaining amount of the liquid reducing agent;

a base of a densitometer which detects concentration of the liquid reducing agent;

a heat exchanger which is arranged to surround detectors suspending from the bases of both the water level indicator and the densitometer, and to circulate heat medium of which a heat source is an engine to conduct heat exchange between the liquid reducing agent and the heat medium; and a suction tube which allows the liquid reducing agent to be sucked from a position located at a bottom of the container main body and between the water level indicator and the densitometer, wherein a box-shaped member having a substantially box shape is disposed to surround the water level indicator, the densitometer and the suction tube which are located adjacent to a lower portion of the heat exchanger.

Here, if the heat exchanger is formed of a pipe member bent in substantially a U-shape and extending so as to provide a mutual connection between the inlet and the outlet of the heat medium, the entire length of the heat exchanger in the reducing agent container is increased, and heat can be efficiently exchanged between the liquid reducing agent and the heat medium of the heat exchanger. Further, when the suction tube is provided with a suction port formed in a tip end thereof which is extended to lie in a plane substantially even with a horizontal surface passing through a center axis of the pipe member which forms the heat exchanger and extends along a bottom surface of the container main body, and when an outer periphery of the suction port is fixedly secured to the pipe member, it is possible to expect that the heat from the heat exchanger is easily transferred and unfreezing in a short time, and the vicinity of the opening of the suction port of the tube becomes difficult to be frozen. If the inner bottom wall of the box-shaped member is fixedly secured to the pipe member, the temperature of the inner bottom wall rises by the use of heat transmitted from the heat exchanger, the temperature of the liquid reducing agent existing in the box-shaped member is increased by heat from the bottom wall of the box-shaped member in addition to heat from the heat exchanger, and it can be unfrozen in shorter time.

In addition, the suction tube may be fixedly arranged such that a portion thereof extends along the pipe member at a pipe portion connected to the inlet of the heat medium, so that the liquid reducing agent which is frozen in the suction tube can be unfrozen by heat from the heat exchanger in shorter time. Further, the suction tube may be fixed, at a portion thereof, to an inner sidewall of the box-shaped member, so that the liquid reducing agent which is frozen in the suction tube may be unfrozen by heat from the heat exchanger and the box-shaped member in shorter time.

A still further, a sidewall and an upper wall of the box-shaped member may be made of materials having excellent heat insulative property, so that heat in the box-shaped member may be prevented from being discharged toward the outside through the sidewall and the upper wall, and the time needed for unfreezing the liquid reducing agent may be shortened by the efficient use of heat from the heat exchanger.

According to the structure of the reducing agent container in accordance with the present invention, heat discharged from a lower portion of the heat exchanger is trapped in the box-shaped member, and convection thereof is generated in that region. Therefore, liquid reducing agent remaining around the water level indicator, the densitometer and the suction tube located in the box-shaped member is efficiently unfrozen, and can provide the function for purifying the exhaust gas in shorter time after the engine is started. The liquid reducing agent existing in a higher portion than the box-shaped member is unfrozen in a region of a substantially circular form around the pipe member in shorter time by the heat exchanger. Therefore, the interior of the box-shaped member and the upper space of the reducing agent container are fluidly communicated with each other. Thus, no negative pressure in the box-shaped member is generated by the suction of the liquid reducing agent, and no difficulty in suction of the liquid agent occurs.

DESCRIPTION OF THE PREFERRED EMBODIMENTS

The present invention will be explained in detail with reference to the accompanying drawings.

Figure 1:
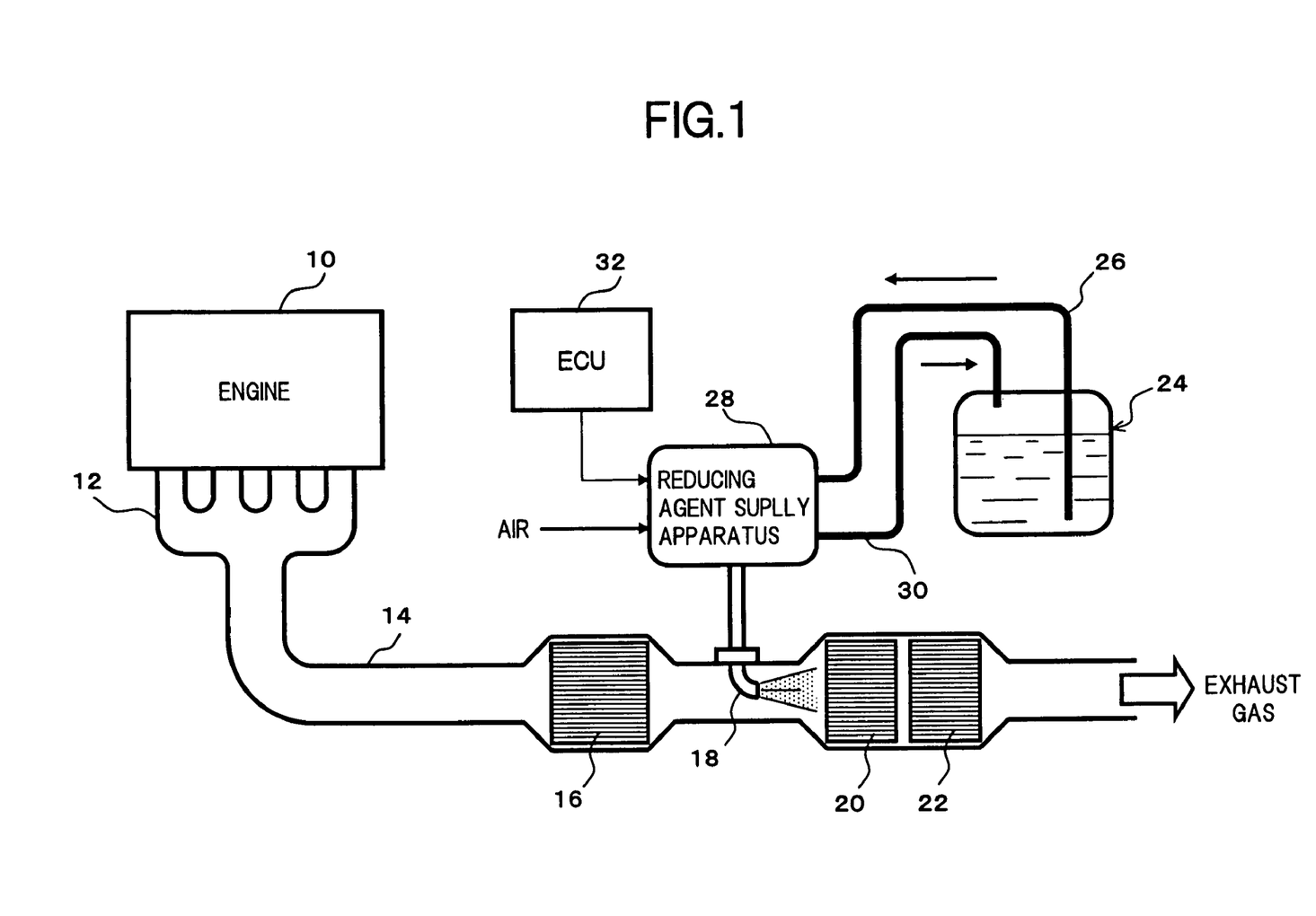
FIG. 1 is a schematic block diagram illustrating the entire structure of an exhaust gas purification apparatus to which the present invention is applied.

FIG. 1 shows the entire structure of an exhaust gas purification apparatus which uses urea aqueous solution as a liquid reducing agent and which purifies NOx included in engine exhaust gas by catalytic reduction reaction.

An exhaust pipe 14 is connected to an exhaust gas manifold 12 of an engine 10. Disposed in the exhaust pipe 14 along a flowing direction of exhaust gas are an oxidation catalytic converter 16 which oxidizes nitric oxide (NO) into nitrogen dioxide ($NO_2$), an injection nozzle 18 which injects and supplies urea aqueous solution, an NOx reduction catalytic converter 20 which reduces and purifies NOx with ammonia obtained by hydrolyzing the urea aqueous solution, and an ammonia oxidation catalytic converter 22 which oxidizes ammonia which has passed through the NOx reduction catalytic converter 20. The urea aqueous solution stored in a reducing agent container 24 is supplied to a reducing agent supply apparatus 28 through a supply pipe 26 of which a suction port is arranged at a position adjacent to the bottom of the reducing agent container 24. Excessive urea aqueous solution which is not injected by the reducing agent supply apparatus 28 is returned into an upper space in the reducing agent container 24 through a return tube 30. The reducing agent supply apparatus 28 is controlled by a control unit 32 having incorporated therein a computer. The reducing agent supply apparatus 28 supplies a necessary amount of urea aqueous solution suitable for the operation condition of the engine, to the injection nozzle 18 while mixing the urea aqueous solution with air.

In the exhaust gas purification apparatus, the urea aqueous solution injected and supplied from the injection nozzle 18 is hydrolyzed by exhaust gas heat and vapor in the exhaust gas, and generates ammonia. It is known that the generated ammonia reacts with NOx in the exhaust gas within the NOx reduction catalytic converter 20 so as to be converted into water and harmless gas, and as a result, the exhaust gas is purified. At this stage, to enhance the NOx purifying rate of the NOx reduction catalytic converter 20, NO is oxidized into $NO_2$ by the oxidation catalytic converter 16, and the rate of NO and $NO_2$ in the exhaust gas is improved into a value suitable for catalytic reduction reaction. The ammonia which has passed through the NOx reduction catalytic converter 20 is oxidized by the ammonia oxidation catalytic converter 22 disposed in the exhaust gas downstream of the NOx reduction catalytic converter 20, and thus, it is possible to prevent discharging of the ammonia as it is with the ammonia smell into atmosphere.

Figure 2:
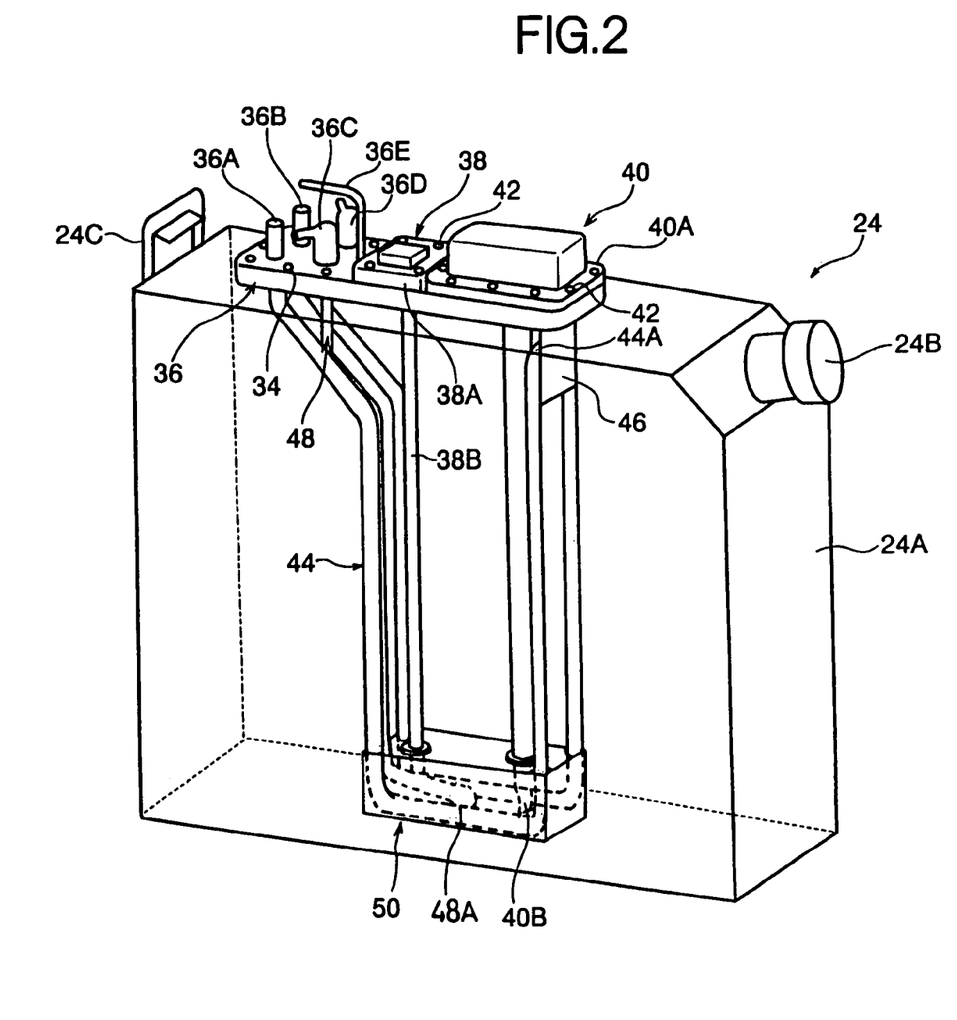
FIG. 2 is a perspective view of a reducing agent container illustrating an arrangement of an upper surface thereof and its internal structure.

As shown in FIG. 2, the reducing agent container 24 has a substantially rectangular parallelepiped container main body 24A, and a replenish port 24B for replenishing urea aqueous solution and a handle 24C which is grasped when the reducing agent container 24 is conveyed are formed on side surface upper portions forming two surface width in a longitudinal direction of the container main body 24A. The container main body 24A has an upper surface thereof in which an aperture (not shown) is formed, and a canopy 36 is detachably fastened to the aperture by a plurality of bolts 34 as fastening members so as to close this aperture.

The canopy 36 is provided, at an upper surface thereof, with an inlet 36A and an outlet 36B of engine coolant as heat mediums using the engine as a heat source, a supply port 36C and a return port 36D of the urea aqueous solution, and an aperture 36E which is opened into the atmosphere so that pressure in an upper space in the canopy 36 is not brought into negative pressure. These inlet 36A, outlet 36B, supply port 36C, return port 36D and aperture 36E are arranged on the upper surface of the canopy 36 from one end portion to the central portion in the longitudinal direction thereof. In the canopy 36, from the central portion thereof to the other end in the longitudinal direction thereof, a base 38A of a water level indicator 38 which detects a remaining amount of the urea aqueous solution, and a base 40A of a densitometer 40 which detects concentration of the urea aqueous solution are detachably fastened to each other through bolts 42 as fastening members. The water level indicator 38 has an inner electrode and an outer electrode each having a circular cross section, and the inner and outer electrodes are concentrically disposed. They detect the water level of the urea aqueous solution from variation of static capacity between both electrodes. A detector 38B comprised of an inner electrode and an outer electrode is provided so as to be suspended from the base 38A toward a bottom of the container main body 24A. The densitometer 40 detects the concentration of the urea aqueous solution from temperature transfer characteristics between separated two points. A detector 40B is suspended from the base 40A so that the detector 40B is located on the bottom of the container main body 24A.

Figure 3:
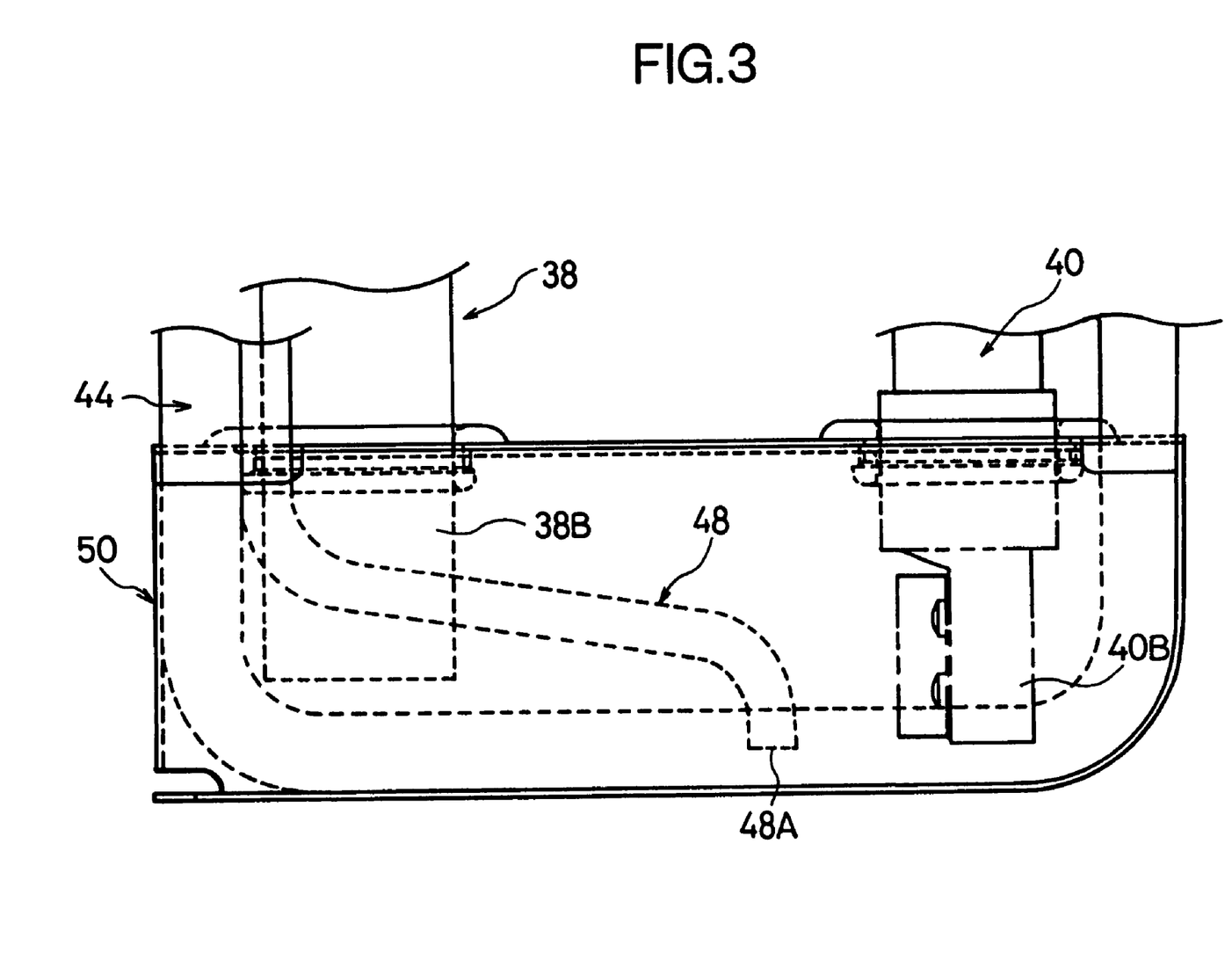
FIG. 3 is a front view of a protector fixed to a lower portion of a heat exchanger.
Figure 4:
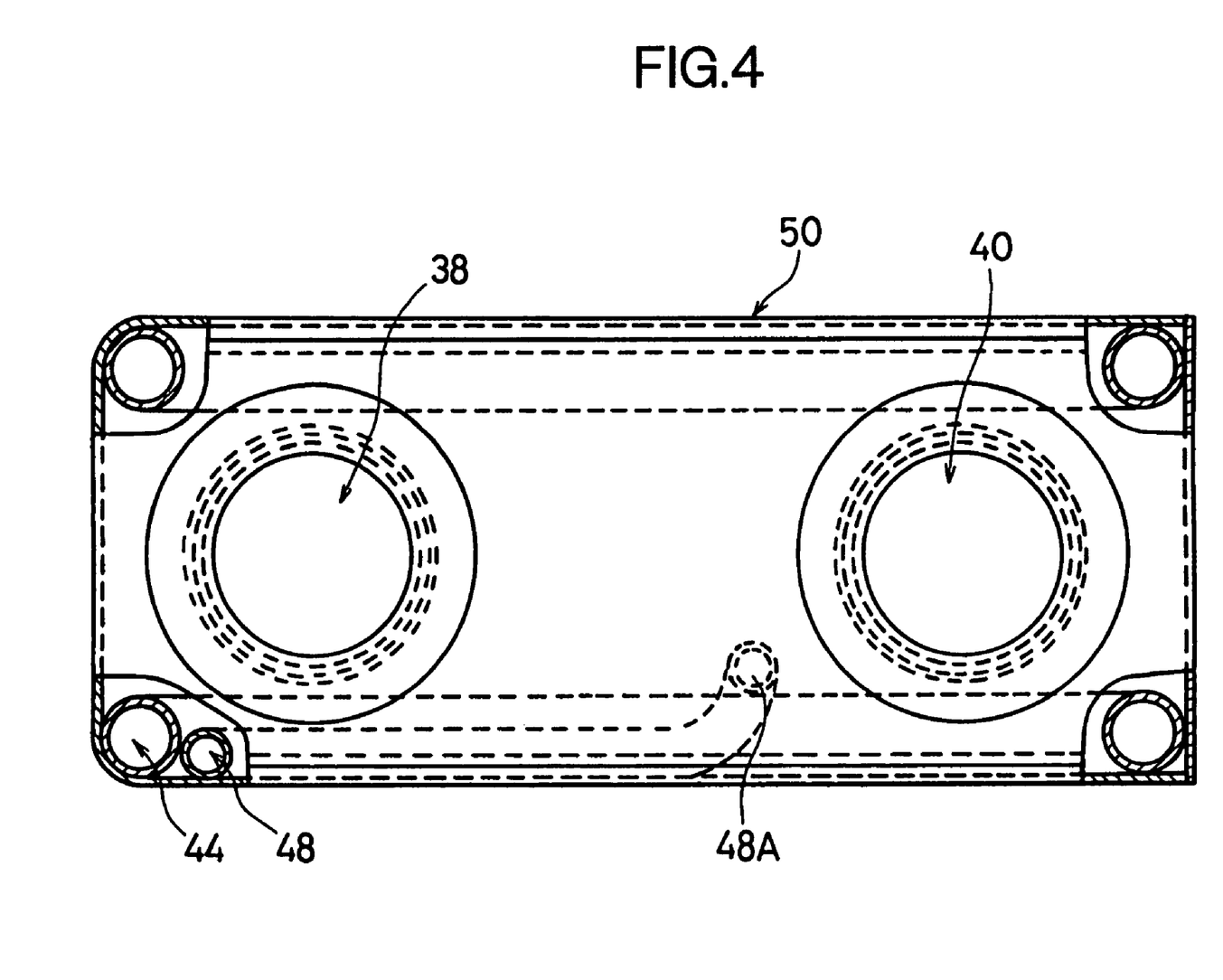
FIG. 4 is a plan view of the protector fixed to the lower portion of the heat exchanger.

The inlet 36A and the outlet 36B of the engine coolant are connected to each other through a heat exchanger 44 disposed in the container main body 24A. As shown in FIGS. 3 and 4, the heat exchanger 44 is formed by bending a substantially U-shaped pipe member so as to surround the water level indicator 38 and the densitometer 40 at the bottom of the container main body 24A. A tip end bent portion 44A of the heat exchanger 44 is supported by a bracket 46 fixed to the canopy 36. Since the heat exchanger 44 is formed of a pipe member bent in substantially a U-shape, the entire length of the pipe member of the heat exchanger 44 in the reducing agent container is increased, and heat can efficiently be exchanged between the liquid reducing agent and heat medium flowing in the heat exchanger 44. The tip end U-shaped bent portion 44A of the heat exchanger 44 is supported by the bracket 46 fixed to the canopy 36, and thus practically supported by and fixed to three points of the canopy 36, thereby strengthening its mounting rigidity.

Figure 5:
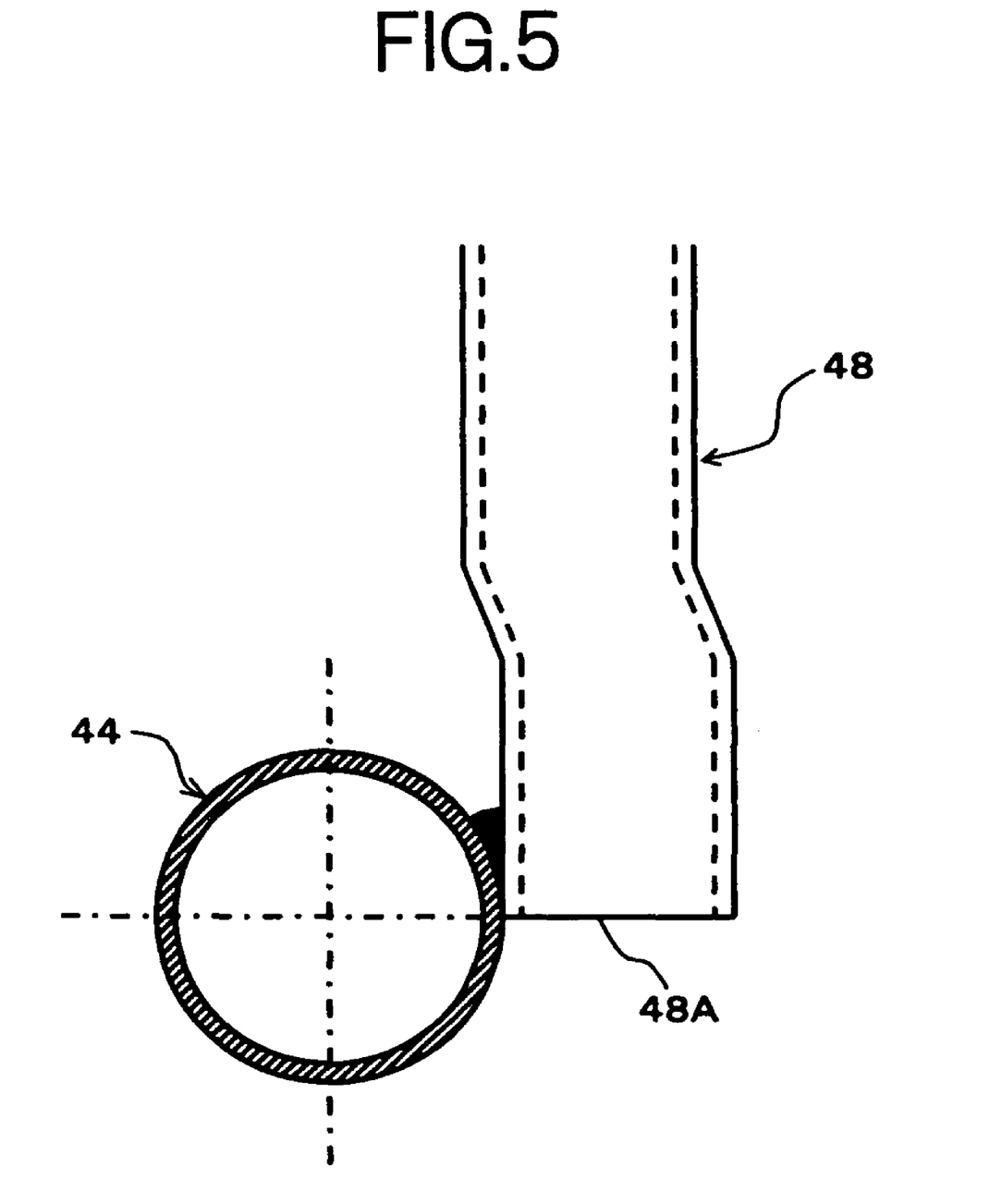
FIG. 5 is a diagrammatic view illustrating a fixing structure of a suction port formed on a tip end of a suction tube.

A suction tube 48 which sucks urea aqueous solution from a position located adjacent to the bottom of the container main body 24A and between the water level indicator 38 and the densitometer 40 is connected to the supply port 36C of the urea aqueous solution. A portion of the suction tube 48 extends along a pipe portion of the pipe member configuring the heat exchanger 44 which extends from the inlet 36A of the engine coolant to the bottom of the container main body 24A, and the suction tube 48 is welded and brazed to that pipe portion of the pipe member. The suction tube 48 is formed at its tip end with a suction port 48A. A portion of the suction tube 48 from its intermediate portion to the tip end is bent such that the suction port 48A opens downward at a position between the water level indicator 38 and the densitometer 40. As shown in FIG. 5, the suction port 48A of the suction tube 48 extends to lie in a plane substantially flush with a horizontal surface passing through an axis of the pipe member of the heat exchanger 44 arranged to extend along a bottom surface of the container main body 24A. An outer periphery of the suction port 48A is welded or brazed to the pipe member of the heat exchanger 44.

Figure 6:
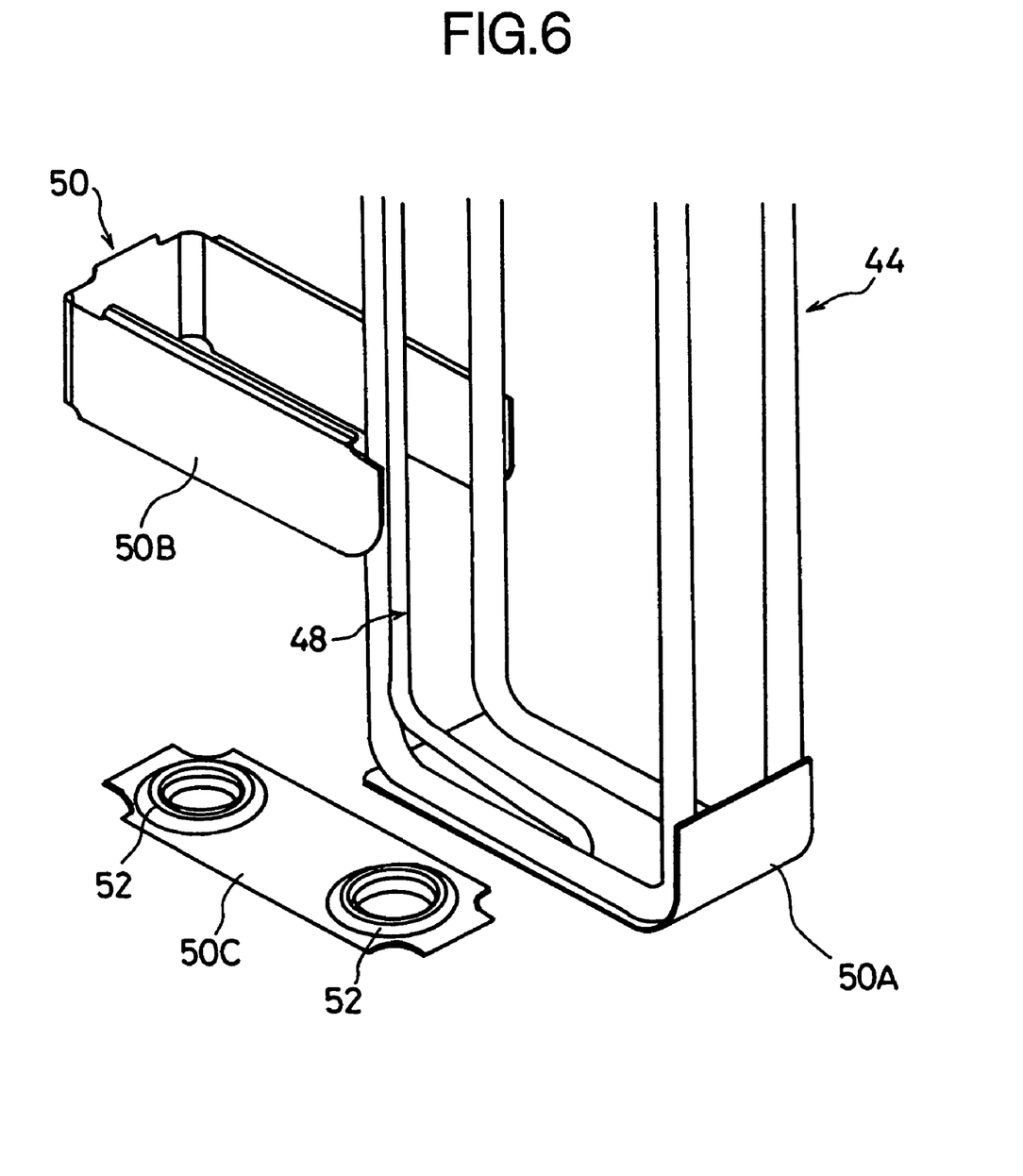
FIG. 6 is a partial perspective view illustrating a detailed structure of the protector.

A substantially box-shaped protector 50 formed in a box-shaped member is fixedly secured to a lower portion of the heat exchanger 44. The box-shaped protector 50 protects the water level indicator 38 and the densitometer 40 from a block of ice of the urea aqueous solution if the urea aqueous were frozen in the reducing agent container 24. The protector 50 also surrounds portions of the water level indicator 38, the densitometer 40 and the suction tube 48, which are located adjacent to a lower portion of the heat exchanger 44 to trap the heat discharged from the heat exchanger 44. As shown in FIG. 6, the protector 50 includes a bottom plate member 50A, a side plate member 50B and a ceiling plate member 50C. The bottom plate member 50A forms a bottom surface and one side surface of the protector 50, and is made of a thin metal member having a substantially L-shaped cross section. The side plate member 50B forms three side walls and is made of a thin metal member similar to the known channel member having a substantially flattened U-shaped section. The ceiling plate member 50C forms an upper surface of the protector 50, is a thin metal member having a substantially rectangular shape, and is formed at its four corners with notches through which the heat exchanger 44 and the suction tube 48 pass. The bottom plate member 50A is fixed to a pipe member of the heat exchanger 44, the side plate member 50B is fixed to the bottom plate member 50A, and the ceiling plate member 50C is fixed to the bottom plate member 50A and the side plate member 50B by welding or brazing. The structure of the protector 50 is not limited to that shown in FIG. 6, and any structure may be employed as long as the protector 50 has the substantially box-like shape capable of surrounding the water level indicator 38, the densitometer 40 and the suction tube 48 located in the lower portion of the heat exchanger 44.

It is preferred that the portion of the suction tube 48 from its intermediate portion to its tip end is fixed to the side plate member 50B by welding or brazing. Grommets 52 made of elastic material such as rubber are mounted on the ceiling plate member 50C so that the water level indicator 38 and the densitometer 40 are detachably fitted and supported.

Next, effect of the reducing agent container 24 having the above-described structure will be explained.

If the engine 10 is stopped for a long time in a state where the outside air temperature is equal to or lower than a freezing point of the urea aqueous solution, heat is lost from the outer periphery of the reducing agent container 24 by the outside air, the urea aqueous solution starts freezing from the outer periphery, and the freezing gradually proceeds toward a central portion of the container. If the engine 10 is started in this state, the engine coolant, whose temperature rises with time, starts circulating through the heat exchanger 44. Then, if the engine coolant temperature becomes higher than the freezing point of the urea aqueous solution, the urea aqueous solution which froze in the reducing agent container 24 gradually starts unfreezing.

At this stage, the heat discharged from the lower portion of the heat exchanger 44 is trapped in the protector 50, and convection is generated in that region. Thus, the urea aqueous solution existing around the water level indicator 38, the densitometer 40 and the suction tube 48 located in the protector 50 is efficiently unfrozen, and it is possible to exhibit the exhaust gas purification function in a short time after the engine is started. The urea aqueous solution located higher than the protector 50 is unfrozen in a substantially circular form around the pipe member in a short time by the heat exchanger 44, and thus, the interior of the protector 50 and the upper space of the reducing agent container 24 are brought into communication with each other. Therefore, the pressure in the protector 50 is not brought into negative value by the suction of the urea aqueous solution, and the sucking operation does not become difficult.

The suction port 48A formed in the tip end of the suction tube 48 is provided so as to extend and to lie in a plane substantially flush with the horizontal surface passing through the axis of the pipe member of the heat exchanger 44 extending along the bottom surface of the container main body 24A, and the outer periphery of the suction port 48A is fixedly secured to the pipe member. Therefore, the heat from the heat exchanger 44 is easily transferred and unfreezing the urea aqueous solution in a short time can be expected, and it is possible to make it difficult to freeze around the opening of the suction port 48A. Since the protector 50 is fixedly secured to the heat exchanger 44 through the bottom plate member 50A, the temperature of the protector 50 is increased by the heat transferring from the heat exchanger 44. Therefore, the temperature of the urea aqueous solution remaining in the protector 50 is increased by heat from peripheral walls of the protector 50 in addition to the heat from the heat exchanger 44, and the urea aqueous solution is unfrozen in shorter time. In addition, a portion of the suction tube 48 is fixedly arranged such that it extends along a portion of the pipe member of the heat exchanger 44, which is connected to the inlet 36A of the engine coolant, and the other portion of the suction tube 48 is fixed to the side plate member 50B in the protector 50. Therefore, the urea aqueous solution which is frozen in the suction tube 48 can be unfrozen by the heat of the heat exchanger 44 and the protector 50 in as short a time as possible.

The tip ends of the water level indicator 38 and the densitometer 40 are resiliently supported by the grommets 52 mounted on the ceiling plate member 50C of the protector 50, and thus can be detached for the maintenance. Even if vibration during running or impact of collision of a block of ice is caused, its impact force is absorbed, and the function can be maintained for a long term.

Fins may be provided around the pipe member of the heat exchanger 44 to efficiently exchange heat between the heat exchanger 44 and the urea aqueous solution. The side plate member 50B and the ceiling plate member 50C of the protector 50 may be made of member having excellent thermal insulative property (resin, rubber and the like). With this, it is possible to suppress heat in the protector 50 from being discharged toward the outside through its sidewall and upper wall, and the heat from the heat exchanger 44 is efficiently utilized, thereby shortening the unfreezing time.

It should be understood that the present invention is not intended to be limited to the exhaust gas purification apparatus using urea aqueous solution as a liquid reducing agent, and the invention can also be equally applied to an exhaust gas purification apparatus using gasoline, diesel oil, alcohol or the like comprised of hydrocarbon as a main component thereof as the liquid reducing agent.

We claim:

1. A structure of a reducing agent container having a main body thereof and storing therein a liquid reducing agent used in an exhaust gas purification apparatus for reducing and purifying nitrogen oxide in an exhaust gas, the container main body having an upper surface thereof on which there are provided:
    a base of a water level indicator which detects a remaining amount of liquid reducing agent;
    a base of a densitometer which detects concentration of the liquid reducing agent;
    a heat exchanger which surrounds detectors arranged to suspend from the bases of the water level indicator and the densitometer and to circulate heat medium of which a heat source is an engine to carry out heat exchange between the liquid reducing agent and the heat medium; and
    a suction tube which allows the liquid reducing agent to be sucked from a position located adjacent to a bottom of the container main body and between the water level indicator and the densitometer;
    wherein a box-shaped member formed in a substantially box shape is disposed so as to surround the water level indicator, the densitometer and the suction tube located at a position adjacent to a lower portion of the heat exchanger.

2. The structure of the reducing agent container according to claim 1, wherein the heat exchanger is formed of a pipe member bent in a substantially U-shape and being capable of providing a mutual connection between an inlet and an outlet of the heat medium.

3. The structure of the reducing agent container according to claim 2, wherein the suction tube having a tip end thereof formed with a suction port arranged to extend to a position lying in a plane substantially flush with a horizontal surface passing through an axis of the pipe member of the heat exchanger which extends along a bottom surface of the container main body, and an outer periphery of the suction port is fixedly secured to the pipe member.

4. The structure of the reducing agent container according to claim 2, wherein an inner bottom wall of the box-shaped member is fixedly attached to the pipe member.

5. The structure of the reducing agent container according to claim 2, wherein the suction tube is fixed to the pipe member connected to the inlet of the heat medium such that a portion of the suction tube extends along the pipe member.

6. The structure of the reducing agent container according to claim 1, wherein a portion of the suction tube is fixed to an inner sidewall of the box-shaped member in the box-shaped member.

7. The structure of the reducing agent container according to claim 1, wherein a sidewall and an upper wall of the box-shaped member are made of thermal insulative members.

* * * * *